United States Patent [19]
Chen et al.

[11] Patent Number: 5,521,337
[45] Date of Patent: May 28, 1996

[54] SEISMIC PROFILING TOOL WITH VARIABLE SOURCE/RECEIVER SPACER

[75] Inventors: Sen-Tsuen Chen, Sugar Land; Linda J. Zimmerman, Houston; Mark A. Miller, deceased, late of Houston, all of Tex., by Laura J. Miller, executrix

[73] Assignee: Exxon Production Research Company, Houston, Tex.

[21] Appl. No.: 314,209

[22] Filed: Sep. 28, 1994

[51] Int. Cl.⁶ ............................................. G01V 1/40
[52] U.S. Cl. .................... 181/102; 181/108; 367/25; 367/911
[58] Field of Search ................ 367/25, 86, 911, 367/35; 181/102, 108, 105, 104, 401; 166/250, 385

[56] References Cited

U.S. PATENT DOCUMENTS

| | | | |
|---|---|---|---|
| 2,265,768 | 12/1941 | Athy et al. | 367/25 |
| 4,460,986 | 7/1984 | Millouet et al. | 367/27 |
| 4,684,947 | 8/1987 | Zimmer | 340/858 |
| 4,696,653 | 8/1987 | Staron et al. | 367/25 |
| 4,888,740 | 12/1989 | Brie et al. | 367/30 |
| 4,992,994 | 12/1991 | Rambow et al. | 367/25 |
| 5,212,354 | 5/1993 | Miller et al. | 181/108 |

OTHER PUBLICATIONS

Chen, S. T., 1993, "A Single-Well Profiling Tool and Tube-Wave Suppression", 1993 SEG Annual Meeting.
Krohn, C. E., 1992, Geophysics, 57:841–847.

*Primary Examiner*—Ian J. Lobo
*Attorney, Agent, or Firm*—Pravel Hewitt Kimball & Krieger

[57] ABSTRACT

A seismic profiling tool is moveable on a wireline in a well bore for exploring subsurface formations adjacent the well bore at various source-receiver spacings. The tool includes at least one acoustic source, an acoustic receiver assembly, and a spacing system for providing variable spacing and relative movement between the source and receiver assembly.

16 Claims, 2 Drawing Sheets

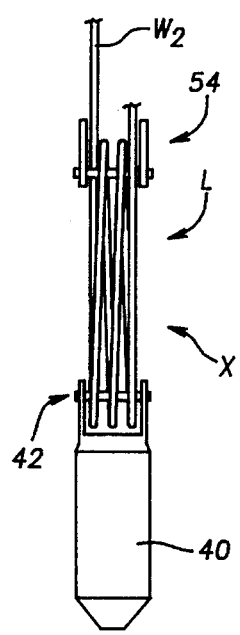
FIG. 2
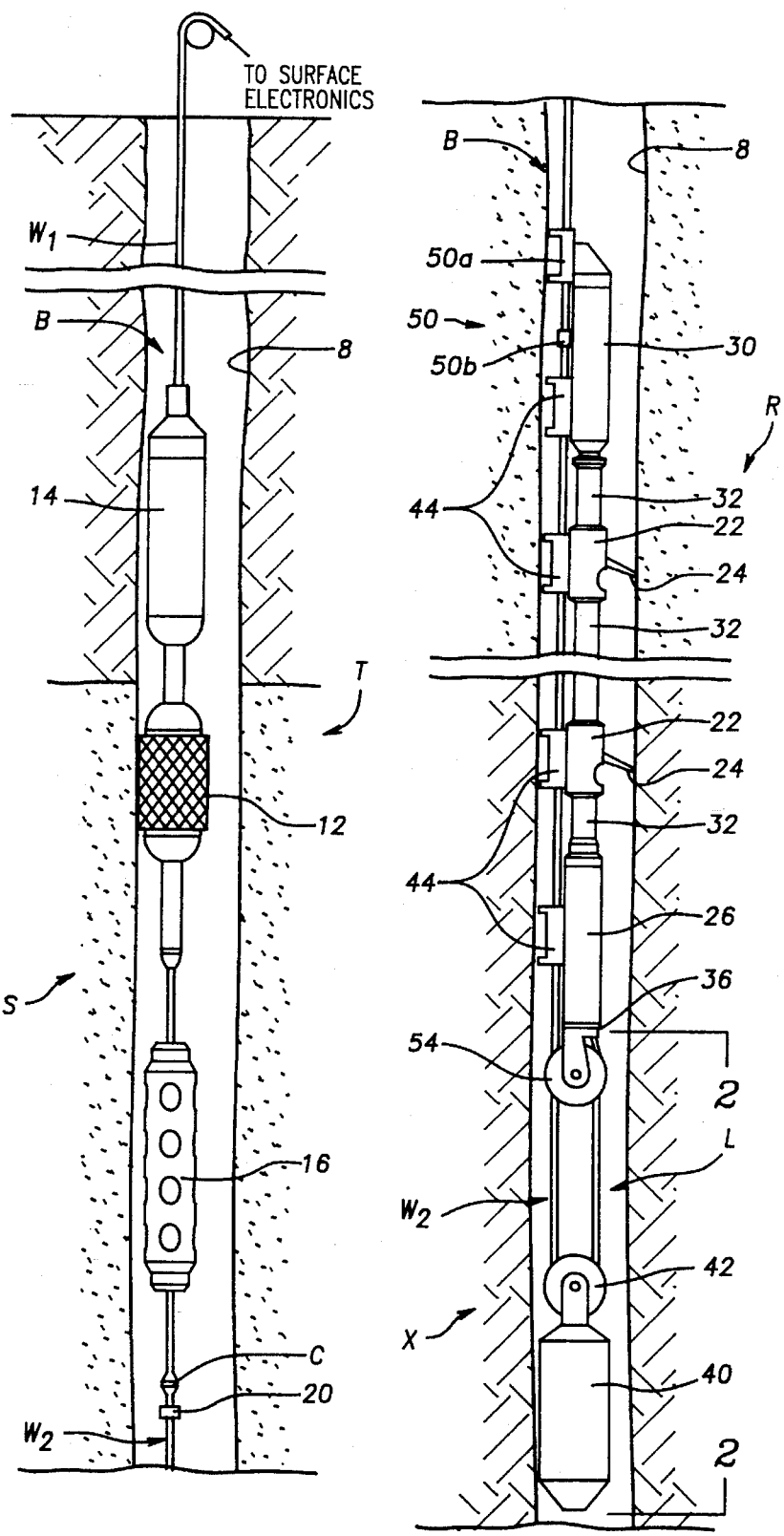
FIG. 1A
FIG. 1B

SEISMIC PROFILING TOOL WITH VARIABLE SOURCE/RECEIVER SPACER

BACKGROUND OF THE INVENTION

1. Field of the Invention

The present invention relates to a seismic profiling tool and method for measuring characteristics of subsurface formations adjacent a borehole.

2. Description of the Related Art

Seismic imaging of complex geologic structures, such as salt flanks, faults, or steeply dipping beds has required the collection of many tens or even hundreds of downhole source/receiver data pairs from a variety of source/receiver spacing intervals. Collecting such a large volume of data has been expensive and devices used for single well imaging have been difficult and risky to deploy. Known techniques have had inherent inaccuracies and imposed significant opportunity costs.

Deploying hundreds of receiver stations or sources downhole simultaneously has proven to be operationally infeasible. The use of a large quantity of wall-clamped geophone receivers proved particularly impractical because the risk of a receiver string becoming stuck in a well increased with every additional receiver clamped to the borehole wall.

One known technique for seismic imaging involved positioning a small number of receivers in the well and repeatedly acquiring data over the same region on sequential passes while varying the spacing between the source and receivers on each pass. An extensive amount of time was required to repeatedly trip the tool out of the well, during which operations such as drilling or production of hydrocarbons could not be performed. The opportunity cost proved prohibitive.

One known technique for seismic attenuation measurements used vertical seismic profiling data collected at seismic frequencies. For accurate measurements, numerous receivers were required at varying distances from the source for each firing of the source. With numerous receivers being used, there were uncertainties in determining attenuation. A first cause was variations in the characteristics of receiver response between different receivers. Another cause was inconsistent borehole coupling of the several receivers to the borehole wall.

SUMMARY OF THE INVENTION

Briefly, the present invention provides a new and improved seismic profiling tool and method for exploring subsurface formations adjacent a well bore. In a first embodiment, the tool is moveable in a well bore on a wireline, and includes at least one acoustic source, acoustic signal receiver assembly, and variable source/receiver spacing system. However, persons skilled in the art will recognize that other types of sources and receivers, such as gamma ray sources and receivers, could be used in the present invention.

The receiver assembly preferably has one or more acoustic detectors and means for removably attaching each detector to the well bore wall. The spacing system provides for variable spacing between the source and receiver assembly while some portion of the wireline tool is anchored to the borehole wall.

In one embodiment, the method of the present invention is performed by lowering a profiling tool into a borehole, anchoring at least one acoustic receiver on a wireline to the borehole wall, moving an acoustic source on the wireline in the borehole with respect to the detectors and emitting seismic energy from the source concurrently with such movement or at a successive number of shot points at different distances from the receiver assembly.

The profiling tool and method of the present invention present less risk of sticking in the well and more quickly acquire data in a manner which is more accurate and efficient.

BRIEF DESCRIPTION OF THE DRAWINGS

A better understanding of the present invention can be obtained when the following description of the preferred embodiment is considered in conjunction with the following drawings, in which:

FIG. 1 is diagram illustrating the relation between FIGS. 1A and 1B; and

FIGS. 1A and 1B are elevation views, taken partly in cross-section, of upper and lower portions, respectively, of a profiling tool of the present invention in a well borehole;

FIG. 2 is a view taken along the lines 2—2 of FIG. 1B; and

DESCRIPTION OF THE PREFERRED EMBODIMENT

Figure 3:
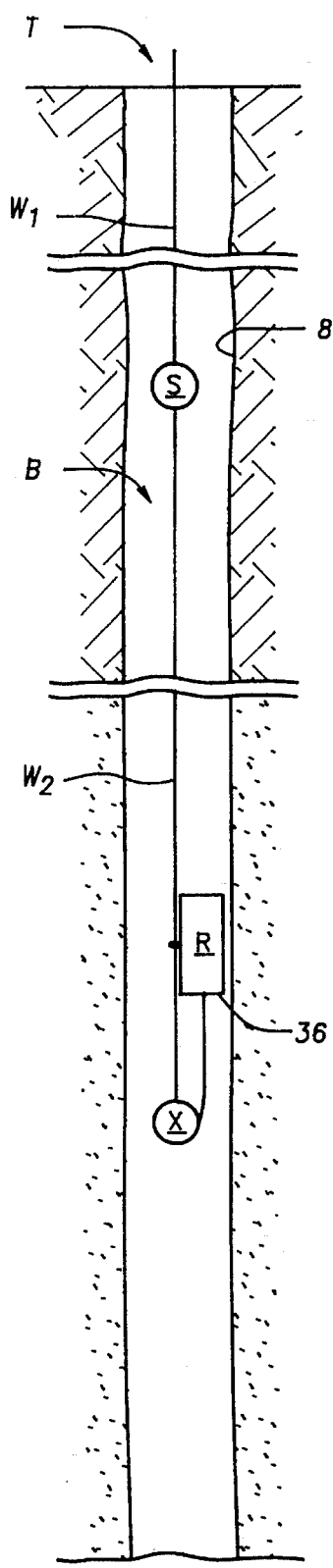
FIGS. 3, 4, and 5 are schematic diagrams of the profiling tool of FIGS. 1A and 1B in operation in a well bore.

A profiling tool T according to the present invention is shown deployed in a well borehole B for exploration of subsurface formations in the vicinity of a borehole wall 8 (FIGS. 1A and 1B). The tool T includes a source assembly S for emission of acoustic signals into the formation, an acoustic receiver assembly R, and a variable source/receiver spacing system X. Each of the source assembly S, receiver assembly R and spacing system X are attached at spaced positions from each other on a wireline W in the well borehole B.

As is conventional, the wireline W includes signal transfer conductors (either electrical or optical) for transferring signals obtained in the receiver assembly R to surface recording electronics and processing/display equipment, such as computers, at the earth surface above the borehole B. The wireline W also contains power conductors for providing electric power to the tool T from a surface power source (not shown).

The wireline W is of the conventional type lowered from the surface under controllable tension. The depth of wireline travel is monitored by a suitable mechanism, such as a sheave wheel. The wireline W has an upper portion $W_1$ (FIG. 1A) in which the source assembly S is connected and a lower portion $W_2$ (FIG. 1B) below the source assembly S to which are connected the receiver assembly R and spacer system X. Disposed on the wireline W at any selected location may be wireline connectors, such as a connector C, for ease of access to and replacement of the components of the tool T on the wireline.

The source assembly S may be any type of acoustic source apparatus capable of being mounted on a wireline and emitting acoustic signals from a well bore into subsurface formations. The components of the source assembly S may therefore vary depending on the particular type of equipment utilized. Also, if desired, the source S may be of the type which can be selectively anchored by any suitable conventional mechanism to the borehole wall B against relative movement.

The source assembly S includes at least one acoustic transmitter or source 12 and an accompanying conventional power supply component 14. In a preferred embodiment of the present invention, the acoustic source 12 may be a stack of hollow piezoelectric transducer (PZT) cylinders driving two end-masses to radiate a broad-band seismic signal with a peak frequency of around 700 Hz. The source 12 in this form radiates more power and at a substantially lower frequency than conventional sonic logging tools, allowing penetration of radiated energy far deeper into surrounding formations.

The power component 14 provides high voltage operating power to the source 12. One or more damper probes 16 may be utilized in the proximity of the source 12 to suppress tube waves propagating through the borehole fluid. A bumper member 20 may be disposed on the wireline W below the source assembly S to sense and indicate reaching of a limit of downward movement during use of the tool T, as will be set forth, to prevent potential damage.

The receiver assembly R is spaced, usually below, the source assembly S by a length of the wireline $W_2$ which may be several hundred to several thousand feet in length, depending on the type of seismic profiling to be performed. For this reason, the tool T is shown in separate FIGS. 1A and 1B. The receiver assembly R can also be located above the source S on the wireline $W_2$ similar distances, if desired.

The receiver assembly R may be any form of a wireline string or array of geophones or acoustic receiving apparatus capable of detecting acoustic signals in the well bore B that can be removably attached to a well bore wall. A suitable type, for example, are those in U.S. Pat. No. 5,212,354, commonly owned with the present application. The disclosure of this patent is hereby incorporated by reference in its entirety.

The receiver assembly R can be either a hydrophone streamer or a multi-level three-component geophone array. In FIG. 1A, the receiver assembly R is shown as including at least upper and lower acoustic detector units 22, each containing at least one geophone for detecting acoustic signals. Depending on profiling requirements, usually at least several more such detector units are included in the receiver assembly R between those shown in the drawings.

Each of the detector units 22 has retractable structure, such as in the form of a hydraulically activated clamping arm or finger 24 for removably attaching the unit 22 to the wall 8 of the well bore B. As is well known in the art, finger 24 contacts the wall of the well bore B thereby forcing the detector unit 22 against the diametrically opposite side of the well bore B. The receiver assembly R also includes a suitable power mechanism for actuating the retractable arms 24 such as a hydraulic pump module 26, which as is typical provides hydraulic pressure for activating the arm 24 of each of the detector units 22.

The receiver assembly R as is conventional also may include signal processing components for conditioning the signals collected by the detectors 22. A suitable such signal conditioning unit is shown as a digitizer 30, which conditions the analog signals received by the detector units 22, converts them into digital signals, and transmits them to the surface through the wireline W.

A flexible connector tube 32 is provided in the receiver assembly R to interconnect the pump module 26, detector units 22 and signal conditioner 30. The connector tube 32 carries within it electrical connector wiring and hydraulic tubing for operation of the components of the receiver assembly R. Electric power and data communications are supplied to the receiver assembly R through the wireline section $W_2$ which is connected at a lowermost or distal end 36 with the pump module 26 by a suitable wireline electrical connector.

The variable source/receiver spacing system X is located beneath the receiver assembly R in the borehole B. The spacing system X includes a sink weight 40 movably mounted on the wireline $W_2$ below the source assembly S. [The weight 40 of the spacing system X is located on the wireline $W_2$ and between the source assembly S and receiver assembly R.] When the receiver assembly R is connected by arms 24 with the well bore wall B, the weight 40 and wireline $W_2$ (with fixedly attached source assembly S) are moveable relative thereto. As will be discussed below, this structure of the present invention provides for controlled adjustment of the distance between the source and receiver assemblies.

The sink weight 40 is of sufficient mass to draw the wireline W and source assembly S down the well bore B in the absence of tension on the wireline W from the surface. The mass of the sink weight 40 may be any suitable shape, having dimensions that allow it to freely move within the borehole B.

In addition to the sink weight 40, the spacing system X includes a pulley 42, a wireline guide sleeve or member 44 on each component of the receiver assembly R and a stopper assembly 50. The wireline $W_2$ extends downwardly from the source assembly S (FIG. 1A) through the stopper assembly 50 and each of the wireline guide sleeves 44 to the pulley 42 to support the sink weight 40. A wireline pulley loop L of any suitable number of turns is formed in the wireline $W_2$ between the pulley 42 above the sink weight 40 and an upper pulley 54. Preferably, upper pulley 54 is attached to the lower end of receiver assembly R (or whatever portion of tool T is to be fixed to the wall of the well bore). The wireline $W_2$ in the loop L is freely rotatably movable over the pulleys 42 and 54. The wireline pulley loop L, depending on the number N of turns it contains, permits the sink weight 40 for each foot or unit of length it moves to move the source S a distance of N times that same length with respect to the receiver R.

The tool T allows the sink weight 40 to move in the absence of wireline tension relative to the receiver assembly R once the receiver assembly R is connected with the well bore wall B. The wireline guide members 44 on the component members of the receiver assembly R guide the movement of wireline section $W_2$ past these components. The guide members 44 further prevent the wireline $W_2$ from being pinched against the well bore wall B as the detector units 22 are clamped in place. Thus, when the detector units 22 are connected with the well bore wall, the sink weight 40, wireline $W_2$ and source assembly S are moveable relative to the receiver assembly R in the well bore B.

The stopper assembly 50 includes a guide member 50a extending from an uppermost one, such as digitizer unit 30, of the components of receiver assembly R. The guide member 50a has space for the wireline $W_2$ to freely pass therethrough. A stopper 50b of a size that will not pass upwardly through the guide member 50a is located on the wireline $W_2$ below the guide member 50a. Thus, upward movement of the wireline $W_2$ and stopper 50b above guide member 50a is prevented when the stopper 50b contacts the guide member 50a. When the tool T is being raised in the well bore, the movement of wireline $W_2$ relative to the receiver assembly R is thus effectively limited to a predetermined minimum length extending in the loop L between the pulley 42 or sink weight 40 and the lower-most component of the receiver assembly R. Stopper 50b is sized so that it can pass freely through guide sleeves 44 and around pulleys 42 and 54.

Figure 4:
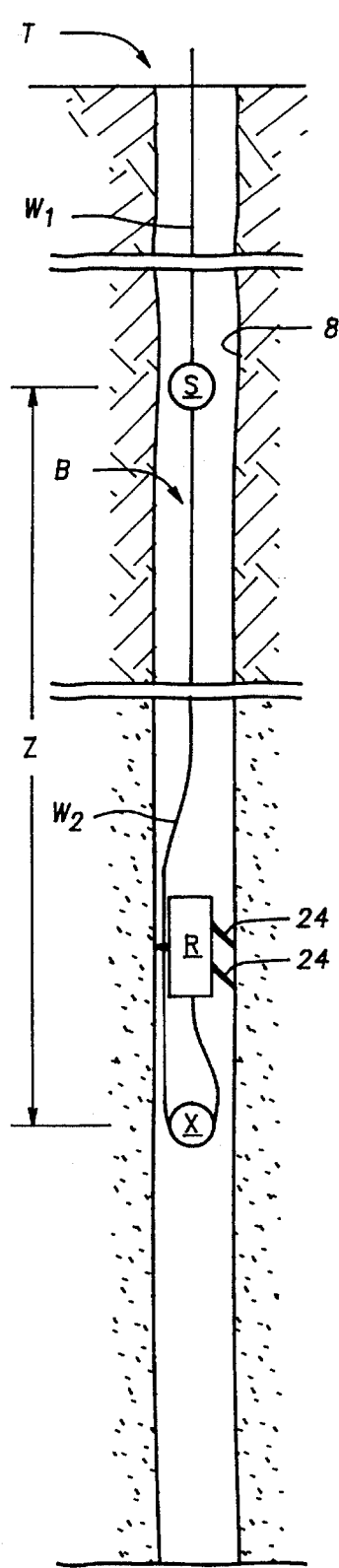

In the operation of the present invention, the tool T is lowered in the borehole B (FIG. 3) with the wireline W in tension. At a suitable borehole depth of interest, each of the detector units 22 of the receiver assembly R is anchored or locked in place by its clamp 24 against the borehole wall 8 (FIG. 4). Alternatively, the source S or some other portion of the wireline tool T can be anchored to the borehole wall 8. The source assembly S is then caused to emit acoustic energy into the subsurface earth formations at an initial spacing Z from the anchored receiver assembly R in the borehole B.

The relative position of the source S and the receiver R with respect to each other is then changed. Usually the receiver assembly R is anchored to the borehole wall 8 and the remaining portions of the tool T are moved. As has been set forth, however, the source S may be anchored rather than the receiver assembly R. Also, both source S and receiver assembly R may be movable and some other portion of the tool T anchored, if desired.

Figure 5:
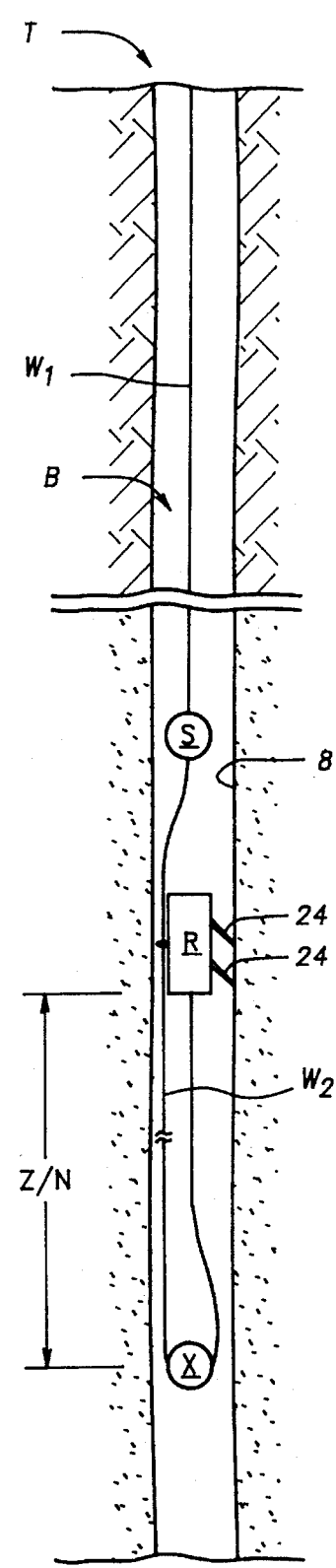

If the source S is movable, the source S can then be moved to a new depth or shotpoint in the well borehole B after emitting seismic energy at the initial spacing Z from the anchored receiver assembly. Tension on the wireline W is released from the surface and the wireline section $W_2$ is drawn downward by the sink weight 40. The source S can emit acoustic energy during such movement, or the source S can be stopped at a new depth or shotpoint by tension from the surface on the wireline section $W_1$. The source assembly S is thus selectively movable with respect to the stationary receiver assembly R through a considerable distance to a limit of downward movement (FIG. 5). The limit of downward movement is reached when the bumper member 20 contacts the stopper 50a. At this time, an indication of the sensing of such a limit is given to protect against insertion of excess cable in the well bore. This could be done, for example, through use of a pressure switch, a magnetic proximity switch, or other similar means, as will be well known to persons skilled in the art.

For collecting desired information, seismic energy can be emitted from the source assembly S either continuously as it is moved in the well bore or while stationary after moving it to a successive number of shot points at different intervals from the anchored receiver assembly R. The number and depth of shot points can be controlled and measured by the wireline W and its conventional control mechanism. The total distance the source S can be moved with respect to the receiver units of assembly R is limited only by the length of wireline section $W_2$. This distance can range from hundreds up to thousands of feet, depending on survey needs.

The receiver assembly R records both refracted arrivals and waves reflected from formation interfaces located near the well bore B. When 3-component geophones are used as receivers, one or more directional devices, such as gyroscopes, can be used to indicate the orientation of the geophones. This information can be used to determine the orientations of the reflectors. High-fold data with many different source/receiver spacings can be collected without using multi-level receivers and/or multi-level sources. Since all data are collected with the detector units 22 locked in place, the tool T ensures consistent coupling for accurate attenuation and true amplitude calibration over many source/receiver spacing combinations.

The present invention may be practiced using as few as only one receiver unit 22 and one downhole source 10 to collect enough data in a reasonable time to create an accurate subsurface image at an affordable cost. Utilization of the tool T avoids the need to repeatedly acquire data over the same region in a well on sequential passes using different length of source/receiver spacers, and replaces the high number of receivers normally required to collect sufficient data.

The present invention allows users to image reflectors at a wide variety of distances from the well without removing the tool from the well and without having to know the approximate distance and orientation of the reflectors relative to the well. Reflection images of reflectors located nearly parallel to the well bore can be produced from data collected with the tool T. Examples of such reflectors includes: the flank of a salt dome; fault interfaces which cut the well bore at a very steep angle; and bed boundaries located above or below a deviated well.

The ability to vary the source/receiver interval gives the tool T of the present invention enhanced flexibility in identifying reflected energy. A very long spacing between the source and receiver assemblies allows the imaging of reflections which arrive before the tube-wave arrivals. A short interval permits the recording of the weaker reflection signals after the very strong first arrival tube-wave diminishes.

The tool T operates in a frequency range of 200 to 1500 Hz. Velocity measured in this range helps resolve the problem of having a frequency gap in the measurement of frequency-dependent velocity. This frequency gap results from the fact that conventional sonic logging tools typically operate at frequencies above 1000 hertz while conventional seismic measurements typically occur at frequencies below about 100 hertz. The tool acts as a low-frequency logging device when the first arrival refracted P-waves and/or shear waves are analyzed for interval P-wave and/or shear wave velocities. Low-frequency logging within the frequency range of the tool T provides a more complete frequency spectrum and helps characterize signal changes with frequency. For low-frequency logging, the tool is operated with relatively long spacing between source and receivers (approximately 30 to 300 feet). Such long spacing allows greater penetration into the formation, thereby avoiding zones which have been invaded by drilling fluid. The penetration of energy with the present invention is more similar to vertical seismic profiling and surface seismic surveys as compared to conventional sonic logs. Accordingly, the use of low-frequency logging data also improves the seismic-to-well tie and provides more accurate seismic amplitude calibration and attenuation measurement.

Data gathered with the imaging tool of the present invention can be processed in three distinct modes: low-frequency logging, reflection imaging, and attenuation analysis. The data processing techniques used are very similar to surface seismic methods. Each mode extracts complimentary information about the subsurface surrounding the well. With the use of the tool T, the single-well reflection method for salt-flank imaging requires knowledge of sediment velocities between the well and the salt flank only. Those velocities can be obtained from the refracted first arrivals of the single-well data set, as well as from conventional velocity analysis as used to analyze surface seismic CDP gathers. Thus, the tool T offers a significant advantage over other salt-flank imaging techniques, such as surface seismic, vertical seismic profiling, and salt proximity surveys, which require accurate velocities over a much larger region.

It should be understood that numerous variations of the present invention may be made. For example, as disclosed above, the source assembly S or some other portion of the tool T than the receiver assembly R may be anchored to the borehole wall 8 while the remainder of the tool T is moved. Also, the receiver assembly R may be located above the source S on the wireline W, if desired. As noted above, the acoustic sources and receivers may be replaced with other types of sources and receivers, such as gamma ray sources and receivers.

The foregoing disclosure and description of the invention are illustrative and explanatory thereof, and various changes in the size, shape, materials, components, surface elements, connections and contacts, as well as in the details of the method of operation may be made without departing from the spirit of the invention.

What is claimed is:

1. A seismic profiling tool moveable on a wireline in a well bore for the exploration of subsurface formations adjacent the well bore, comprising:

at least one acoustic source mounted on the wireline for emitting acoustic signals at selected depths in the well bore into the subsurface formations;

an acoustic receiver assembly mounted on the wireline spaced from said source, said receiver assembly comprising one or more detector units for detecting acoustic signals from said source after travel through the subsurface formations;

means for removably attaching a portion of the tool to the well bore wall at a desired location for relative movement of said source with respect to said receiver assembly in the well bore; and weight means slidably mounted on the wireline between said receiver assembly and said acoustic source for varying the spacing between the depths in the well bore at which said source emits signals and the location of said receiver assembly.

2. The tool of claim 1, wherein said attachment means comprises retractable means with each of said detector units for engaging the well bore wall.

3. The tool of claim 2, wherein said receiver assembly further comprises means for actuating said retractable means.

4. The tool of claim 1, wherein said attachment means comprises means with said acoustic source for attaching said source to the borehole wall.

5. The tool of claim 1, wherein said receiver assembly further comprises means for conditioning the signals collected by said detectors.

6. The tool of claim 1, wherein said receiver assembly is connected to the wireline with a connector disposed at a distal end of the wireline in the well bore.

7. The tool of claim 1, wherein said spacing means further comprises means permitting relative movement of said weight means with respect to said receiver assembly.

8. The tool of claim 7, wherein said means permitting relative movement comprises at least one guide member disposed on said receiver assembly between said weight means and said source for movement of the wireline with respect to said receiver assembly.

9. The tool of claim 1, wherein said spacing means further comprises means for limiting upward movement between said weight means and said receiver assembly during upward movement of the wireline in the well bore.

10. The tool of claim 9, wherein said means for preventing contact comprises a stopper member disposed on said wireline and a stopper guide member connected with said receiver assembly.

11. The tool of claim 1, wherein said spacing means includes:

at least one guide member connected with said receiver assembly for passage of the wireline therethrough;

a pulley for passage of the wireline therepast; and a sink weight connected with said pulley to pull the wireline through said guide member.

12. The tool of claim 11, wherein said spacing means further comprises a second pulley attached to said receiver assembly for passage of the wireline around each of said pulleys.

13. The tool of claim 1, further comprising a bumper member disposed between said source and said receiver assembly for limiting downward movement of said source toward said receiver assembly.

14. A seismic profiling tool moveable on a wireline in a well bore for the exploration of subsurface formations adjacent a borehole wall, comprising:

a seismic source deployed on the wireline;

at least one detector unit;

means for anchoring a portion of the tool to the borehole wall while permitting relative movement of said source with respect to said detector unit;

spacing means including:

a sink weight, a first pulley attaching said sink weight to the wireline, said weight pulling the wireline downwardly in the absence of tension on the wireline to move said source in the borehole while said detector unit is clamped to the borehole wall.

15. The tool of claim 14, further comprising a second pulley attached to said detector unit for passage of the wireline around each of said pulleys.

16. A profiling tool moveable on a wireline in a well bore for the exploration of subsurface formations adjacent the well bore, comprising:

at least one signal source mounted on the wireline for emitting signals at selected depths in the well bore into the subsurface formations;

a receiver assembly mounted on the wireline spaced from said source, said receiver assembly comprising one or more detector units for detecting signals from said signal source after travel through the subsurface formations;

means for removably attaching a portion of the tool to the well bore wall at a desired location for relative movement of said signal source with respect to said receiver assembly in the well bore; and weight means slidably mounted on the wireline between said receiver assembly and said signal source for varying the spacing between the depths in the well bore at which said signal source emits signals and the location of said receiver assembly.

* * * * *